(12) United States Patent
Hupp

(10) Patent No.: US 7,594,616 B2
(45) Date of Patent: Sep. 29, 2009

(54) FLUID DISCHARGE NOZZLE

(75) Inventor: Evan Hupp, Ely, IA (US)

(73) Assignee: Evergreen Packaging Inc., Memphis, TN (US)

( * ) Notice: Subject to any disclaimer, the term of this patent is extended or adjusted under 35 U.S.C. 154(b) by 471 days.

(21) Appl. No.: 11/109,520

(22) Filed: Apr. 19, 2005

(65) Prior Publication Data
US 2006/0237563 A1 Oct. 26, 2006

(51) Int. Cl.
B05B 1/30 (2006.01)
(52) U.S. Cl. .................. 239/570; 239/106; 239/533.15; 239/558; 239/560; 239/561; 239/575; 239/590; 239/596; 239/DIG. 23; 141/311 A; 141/392
(58) Field of Classification Search ................. 239/106, 239/500, 504, 533.1, 533.15, 552, 556, 558, 239/560, 561, 570, 571, 575, 583, 590, 590.3, 239/596, DIG. 23, 428.5, 461–463, 553, 239/553.3; 141/115, 116, 120, 126, 311 A, 141/392
See application file for complete search history.

(56) References Cited
U.S. PATENT DOCUMENTS

| 1,250,222 | A | * | 12/1917 | Rahner | ........................ 239/32 |
| 1,562,971 | A |   | 11/1925 | Kershaw et al. | |
| 1,565,686 | A |   | 12/1925 | Titus | |
| 1,790,625 | A |   | 1/1931 | Kent | |
| 2,352,359 | A | * | 6/1944 | Anderson | ................... 239/575 |
| 2,978,188 | A |   | 4/1961 | Fredrikson | |
| 3,826,061 | A |   | 7/1974 | Hunter | |
| 4,119,276 | A | * | 10/1978 | Nelson | ..................... 239/590.3 |
| 4,410,108 | A |   | 10/1983 | Minard | |
| 4,651,862 | A |   | 3/1987 | Greenfield, Jr. | |
| 4,711,277 | A |   | 12/1987 | Clish | |
| 4,730,786 | A | * | 3/1988 | Nelson | ..................... 239/590.3 |

(Continued)

FOREIGN PATENT DOCUMENTS
EP 0402535 B1 12/1990

(Continued)

OTHER PUBLICATIONS
Patent Abstracts of Japan, vol. 1995. No. 09, Oct. 31, 1995.

(Continued)

Primary Examiner—Steven J Ganey
(74) Attorney, Agent, or Firm—Hasse & Nesbitt LLC; Daniel F. Nesbitt

(57) ABSTRACT

The present invention relates to liquid dispensing devices having discharge nozzles. The discharge nozzle has a flow control device. The flow control device includes a check valve and an outlet. The check valve is capable of creating a vacuum pressure cycle during closing. The outlet is formed from at least one perforated plate. The perforated plate has a plurality of apertures therethrough. The plurality of apertures include at least two differently sized sets of apertures. The at least two differently sized sets of apertures include a larger size set of apertures and a smaller size set of apertures. The larger size set of apertures are centrally located within the perforated plate. The present invention helps to concentrate the greatest vacuum pressure on a decaying portion of a stream of liquid right in the center of the outlet of the discharge nozzle.

19 Claims, 9 Drawing Sheets

U.S. PATENT DOCUMENTS

| | | | |
|---|---|---|---|
| 4,958,669 A | | 9/1990 | Ohta |
| 4,972,865 A | | 11/1990 | Mattson |
| 5,094,278 A | * | 3/1992 | Arao et al. ............... 141/311 A |
| 5,188,289 A | | 2/1993 | Pesho |
| 5,193,593 A | | 3/1993 | Denis et al. |
| 5,335,862 A | | 8/1994 | Esper |
| 5,472,144 A | | 12/1995 | McDonald |
| 5,605,288 A | | 2/1997 | McDonald |
| 5,769,326 A | | 6/1998 | Muchenberger et al. |
| 5,865,221 A | * | 2/1999 | Ludwig et al. ............... 239/590 |
| 5,909,846 A | * | 6/1999 | Sasaki ......................... 239/106 |
| 6,161,780 A | * | 12/2000 | Sugimoto et al. ........... 239/558 |

FOREIGN PATENT DOCUMENTS

| EP | 0411520 | | 2/1991 |
|---|---|---|---|
| EP | 051046 | B1 | 9/1992 |
| EP | 0692427 | B1 | 1/1996 |
| EP | 0775635 | B1 | 5/1997 |
| EP | 0784010 | | 1/2000 |

OTHER PUBLICATIONS

JP 07 155650 A (Shikoku Kakoki Co. Ltd.) Jun. 20, 1995 abstracts; figures 1-3.

The International Preliminary Report on Patentability (IPRP), mailed Jul. 31, 2007, Int'l Application No. PCT/US/2006/002614, filed Jan. 24, 2006 (6 pages) and pending claims of the PCT application (2 pages).

Evan Hupp, Declaration concerning the discharge check valve of the present invention, executed Mar. 23, 2009.

\* cited by examiner

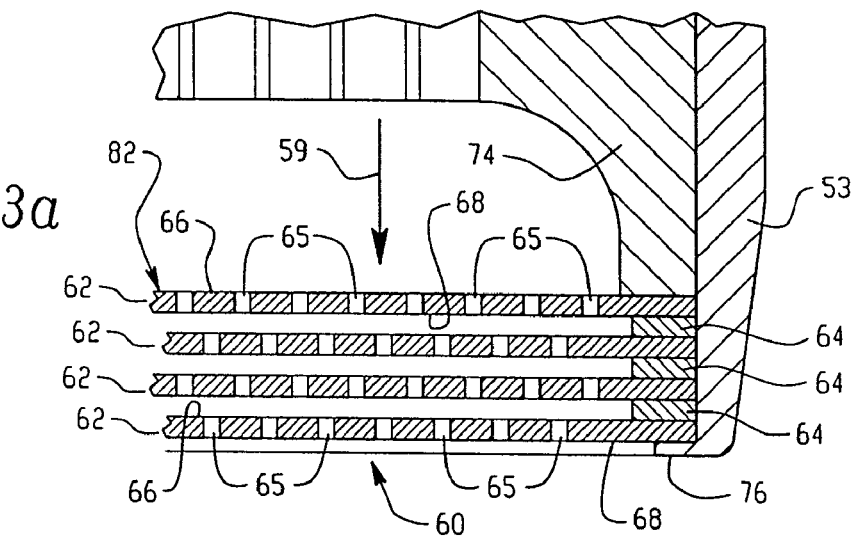
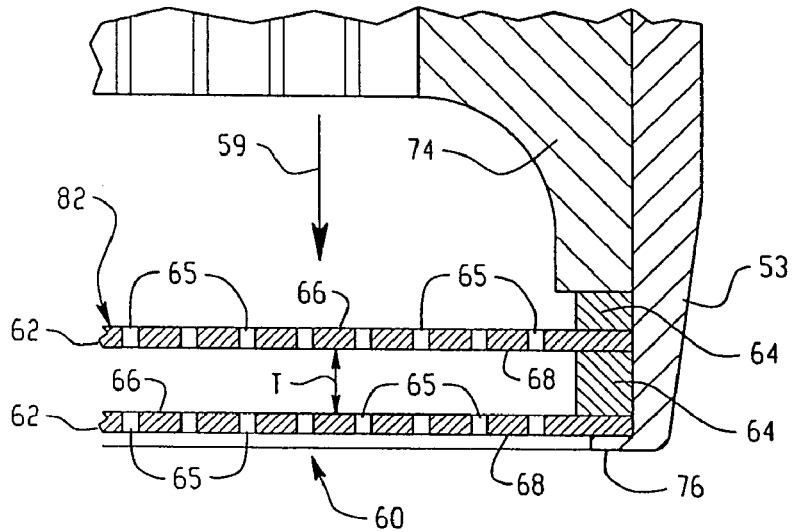
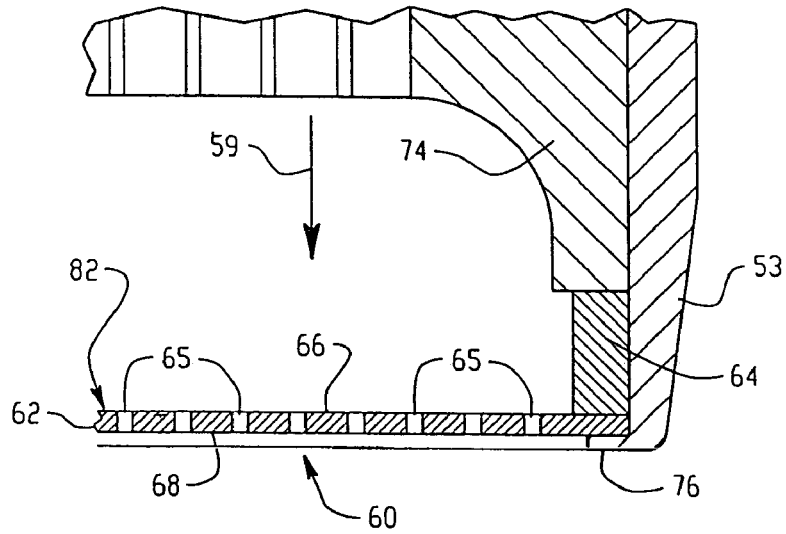

FLUID DISCHARGE NOZZLE

TECHNICAL FIELD

The present invention relates to liquid dispensing devices having discharge nozzles and more particularly to a discharge nozzle having a flow control device.

BACKGROUND OF THE INVENTION

Liquid filling machines are commonly used to fill containers, bottles and gable top cartons with a liquid or other fluid substance, such is as used in the beverage industry for filling bottles with, for example, milk, juice, soda, flavored and unflavored waters, and the like. With increasing product demands by consumers, beverage packagers have been seeking ways to increase the production line speed or rate at which the liquid filling machine can fill one container, index the container, and be ready to fill the next container. Some single-line liquid filling machines now run at rates, for 1 liter sized containers, approaching or exceeding about 150 containers per minute. The desire for faster line speeds has been an ongoing concern of many beverage packagers.

Typical liquid filling machines include a vertically positioned tubular filling nozzle and at least one perforated plate at the exit end of the nozzle, which the liquid passes through just prior to entering into the container. Messiness, spillage, and waste can occur if the liquid continues to flow through the perforated plate of the nozzle while one container is being moved from beneath the nozzle and an empty container is being moved into position below the nozzle. Some nozzles utilize the surface tension of the liquid at uniformly sized apertures in the perforated plate to assist in cessation of this unintended liquid flow.

SUMMARY OF THE INVENTION

The present invention provides a fluid dispensing nozzle. The fluid dispensing nozzle has a housing. The housing has a fluid flow path therethrough. A perforated plate is supported by the housing within the fluid flow path. The perforated plate having a plurality of apertures therethrough wherein there are at least two differently sized apertures. The at least two differently sized apertures include a larger size aperture and a smaller size aperture. The larger size aperture is positioned radially inboard of the smaller size aperture. The larger size aperture can be centrally located within the perforated plate. A plurality of perforated plates within the fluid flow path can also be included. The housing includes a discharge check valve. The discharge check valve is capable of creating a vacuum pressure during closing.

In another embodiment, the fluid dispensing nozzle includes a housing having a fluid flow path therethrough. A discharge check valve is within the housing. The discharge check valve is capable of creating a vacuum pressure during closing. A perforated plate is supported by the housing within the fluid flow path. The perforated plate has a plurality of apertures therethrough. The plurality of apertures include at least two differently sized sets of apertures. The at least two differently sized sets of apertures include a larger size set of apertures and a smaller size set of apertures. The larger size set of apertures are centrally located within the perforated plate. A plurality of perforated plates can also be included. At least one of the perforated plates is formed of a wire mesh. There is at least one aperture having a shape that is different from another aperture. At least one aperture is substantially rectangular. A spacer can be included. The spacer is positioned to maintain separation between at least one perforated plate and another perforated plate.

In still another embodiment, a fluid discharge nozzle is provided. The fluid discharge nozzle includes a nozzle body containing a flow control device within the nozzle body. The flow control device includes a check valve and an outlet. The check valve is capable of creating a vacuum pressure cycle during closing. The outlet is formed from a perforated plate. The perforated plate includes a plurality of apertures. At least one aperture is larger than at least one other aperture. At least one larger size aperture is positioned radially inboard of at least one smaller aperture. A larger size aperture is centrally located within the perforated plate. A plurality of perforated plates can be within the fluid flow path. A spacer can be at the outlet. The spacer can maintain separation between the perforated plates.

BRIEF DESCRIPTION OF THE DRAWINGS

While the specification concludes with claims particularly pointing out and distinctly claiming the present invention, it is believed that the present invention will be better understood from the following description in conjunction with the accompanying drawing figures, in which like reference numerals identify like elements, and wherein:

FIG. 3a is a partial sectional view of the outlet of FIG. 1 shown in an embodiment having four perforated plates;

FIG. 3b is a partial sectional view of the outlet of FIG. 1 shown in an alternative embodiment having two perforated plates;

FIG. 3c is a partial sectional view of the outlet of FIG. 1 shown in an alternative embodiment having a single perforated plate;

DETAILED DESCRIPTION

In this detailed description of the present invention, any patent or non-patent literature referenced herein and the disclosure contained therein is intended to be and is hereby incorporated by reference.

Figure 1:
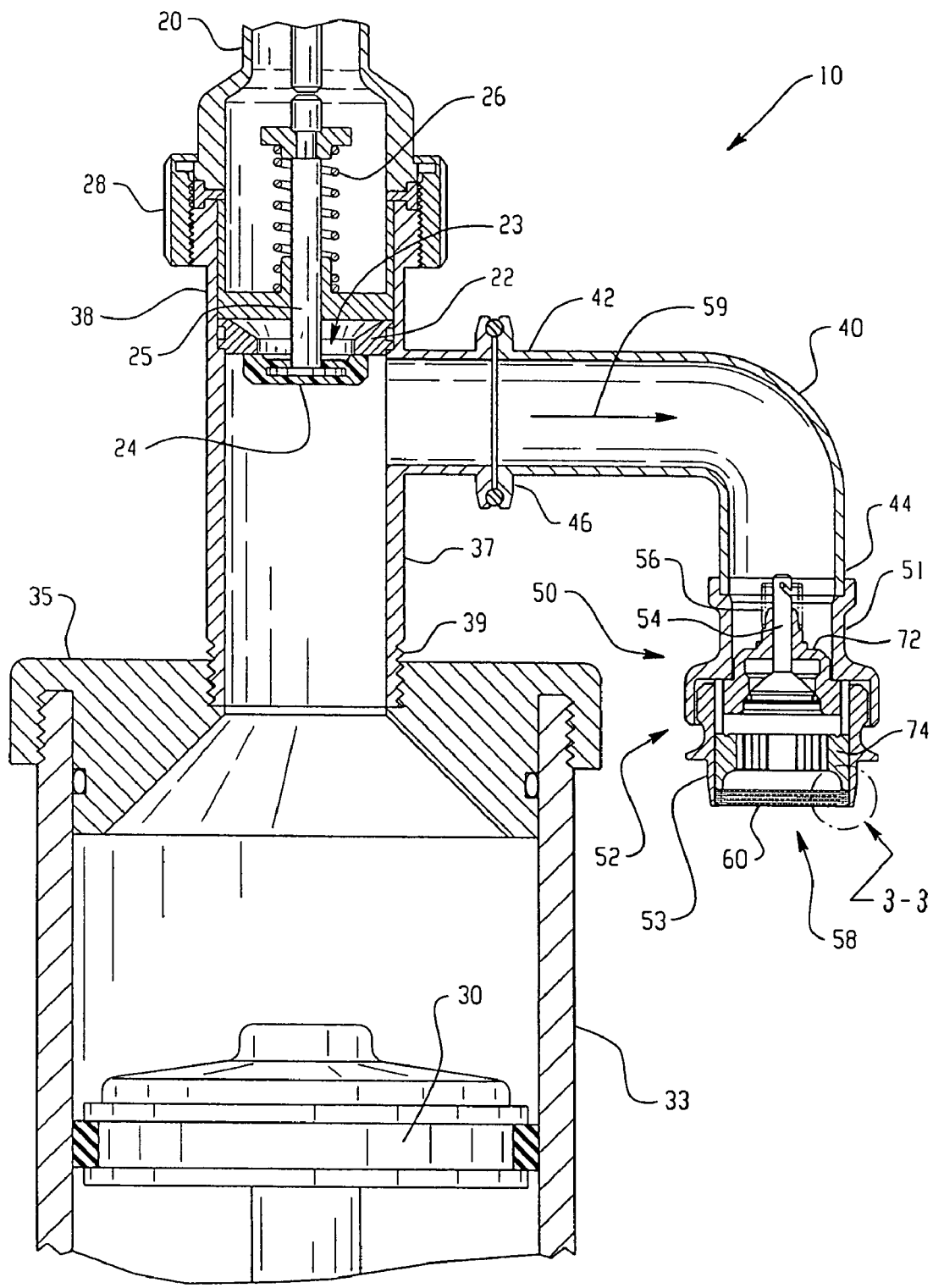
FIG. 1 is a cross-sectional view of an apparatus for dispensing liquid into containers.

Referring now to FIG. 1, wherein a liquid dispensing apparatus 10 is illustrated having a dispensing nozzle 50 in accordance with the present invention. Liquid dispensing apparatus 10 includes an inlet tube 20 that connects that liquid dispensing apparatus 10 to a fluid reservoir (not shown).

Inlet tube 20 is connected to valve holder 28, which contains an inlet check valve 25. Inlet check valve 25 is biased such that cover 24 seals against an inlet ring 22 when inlet check valve 25 is in the closed position. Inlet check valve 25 is biased toward the closed position by first spring 26. When inlet check valve 25 is closed, cover 24 seals entry port 23. Valve holder 28 connects this inlet check valve 25 to upper end 38 of connector tube 37.

Connector tube 37 is also attached to cylinder 33 at lower end 39 of connector tube 37. Lower end 39 of connector tube 37 is connected to cylinder 33 by cap 35. Within cylinder 33 is piston 30. Piston 30 is moveable within cylinder 33. Piston 30 can suck liquid from reservoir through inlet check value 25 and when the stroke is reversed Piston 30 can pressurize any liquid contained within cylinder 33 in order to expel such liquid from cylinder 33.

Connector tube 37 is connected to proximate end 42 of discharge tube 40 at flange 46. Dispensing nozzle 50 is connected to distal end 44 of discharge tube 40 opposite proximate end 42 where connector tube is attached. Upper portion 51 of housing 52 attaches to distal end 44 of discharge tube 40 thereby creating a fluid flow path 59. Fluid flow path 59 passes from inlet tube 20 through inlet check valve 25 via entry port 23 into connector tube 37 and through discharge tube 40 and out through dispensing nozzle 50. Piston 30 assists in moving the liquid from cylinder 33 and connector tube 37 through discharge tube 40 such that the liquid is intentionally expelled from liquid dispensing apparatus 10 through dispensing nozzle 50.

Dispensing nozzle 50 includes a discharge check valve 54 biased by a second spring 56 against valve body 72 in the closed position. Housing 52 comprises an upper portion 51 and a lower portion 53 wherein lower portion 53 confines valve body 72 and positions discharge check valve 54. Discharge check valve 54 is spaced away from outlet 60 by displacer 74.

Figure 2A:
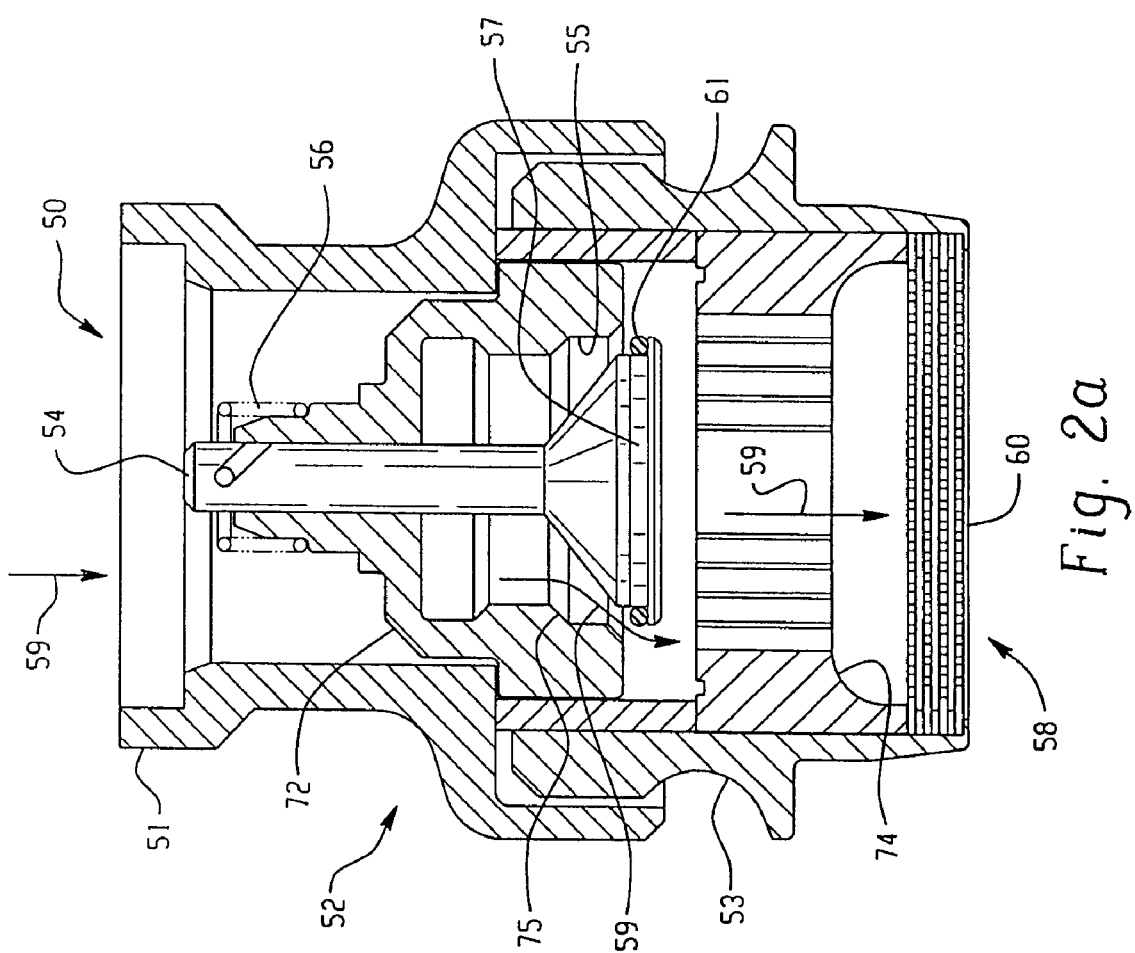
FIG. 2a is a cross-sectional view of the fluid discharge nozzle of the present invention shown in the open position.

Now referring to FIG. 2a in which is shown that dispensing nozzle 50 includes flow control device 58 which is made up of two major components, the first component being discharge check valve 54 and the second component being outlet 60. Discharge check valve 54 is positioned within housing 52 adjacent upper portions 51 and outlet 60 spaced away from upper portion 51 by displacer 74 which is confined within lower portion 53 of housing 52. Within valve body 72 is an annular wall 55 for mating with valve head 57 and adjacent to annular wall 55 in valve body 72, opposite displacer 74, is valve seat 75. In this embodiment, valve seat 75 has a frusto-conical configuration.

Discharge check valve 54 is illustrated as being in the open position. The open position of dispensing check valve 54 is illustrated with fluid flow path 59 passing between valve head 57 and valve body 72. When valve head 57 is displaced away from inner annular wall 55 of valve body 72, an opening is formed creating this fluid flow path 59 through dispensing nozzle 50. In the open position of discharge check valve 54, second spring 56 is compressed. Additionally, in the open position, valve head 57 of discharge check valve 54 is in close proximity to displacer 74.

Figure 2B:
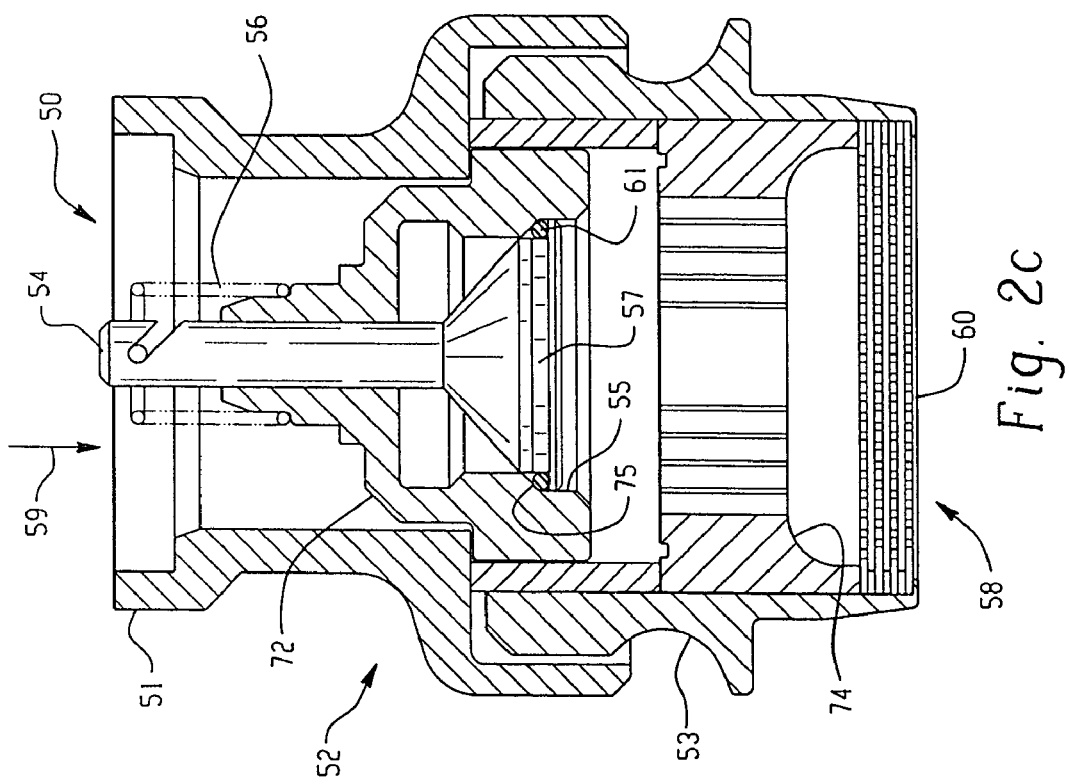
FIG. 2b is a cross-sectional view of the fluid discharge nozzle of the present invention shown in an intermediate position moving from an open position toward a closed position.

Referring now to FIG. 2b, in which is illustrated dispensing nozzle 50 having discharge check valve 54, in an intermediate position moving toward the closed position in which valve head 57 is adjacent annular wall 55 and is closely matched to the inside diameter of annular wall 55 so that there is minimal clearance (no contact). As discharge check valve 54 moves toward the closed position, second spring 56 expands. In this intermediate state, fluid flow path 59 that passed between valve body 72 and valve head 57 has been minimized. As valve head 57 with 0-ring 61 travels along annular wall 55 toward valve seat 75, a vacuum is created and suction is applied to fluid that was passing through outlet 60. In this manner, discharge check valve 54 creates a vacuum pressure cycle within dispensing nozzle 50. This suction continues to be applied as O-ring 61 is compressed and slides across annular wall 55 toward valve seat 75. It can be seen that annular wall 55 can have an axial length that is longer or shorter dependent on the duration of time this vacuum pressure cycle or suction is desired as O-ring 61 slides against annular wall 55.

Figure 2C:
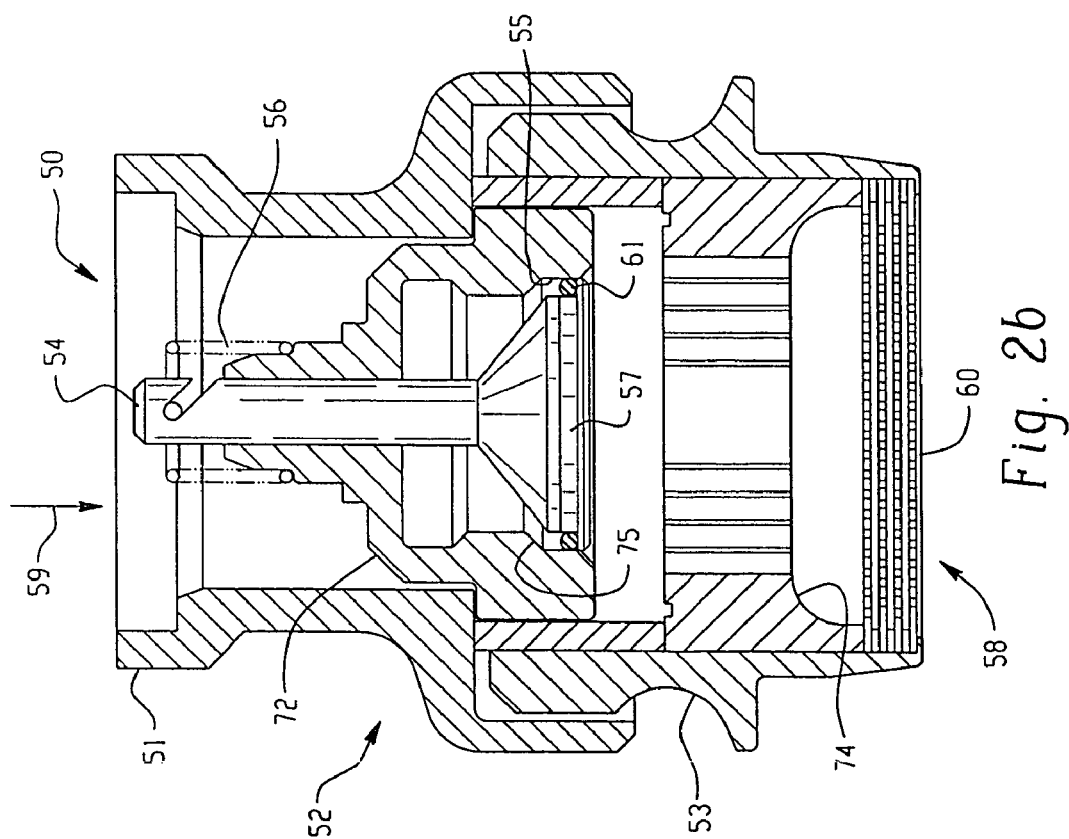
FIG. 2c is a cross-sectional view of the fluid discharge nozzle of the present invention shown in the closed position.

Referring now to FIG. 2c in which is illustrated dispensing nozzle 50 having a flow control device 58 including outlet 60 and discharge check valve 54 wherein discharge check valve 54 is in the closed position. Second spring 56 is fully extended and flow path 59 is closed as O-ring 61 on valve head 57 has passed over annular wall 55 and O-ring 61 is seated and sealed against valve seat 75 within valve body 72. In the closed configuration, valve head 57 is displaced as far as it is permitted to travel away from displacer 74 and intentional flow through outlet 60 has ceased. Valve seat 75 is sized to sealingly engage against O-ring 61 in this closed position.

Such a liquid dispensing apparatus 10 having dispensing nozzle 50 with flow control device 58 is often used in beverage packaging to fill various items with liquid including, for example, bins, bottles, bowls, boxes, buckets, cans, cartons, containers, cups, jars, jugs, pouches, and the like. In one embodiment, a gable top filler can be utilized, including, for example, an EPE Q-16 high-speed filler available from International Paper Company, of Stamford, Connecticut. In another embodiment, a commercially available liquid dispensing apparatus 10 can be utilized, such as, for example, a Pure-Pak® P-S90 standard cross-section filling machine available from Elopak a.s., of Spikkestad, Norway. One liquid dispensing apparatus 10 that may be used with the present invention is described in U.S. Pat. No. 4,958,669 entitled "Device for Filling Specified Amount of Liquid."

Turning now to FIG. 3a in which is shown a partial sectional view of outlet 60 of dispensing nozzle 50. In the embodiment shown, outlet 60 is formed from four overlying perforated plates 62. Perforated plates 62 are each spaced apart from one another by use of outer spacer 64, which forms an air gap between each perforated plate 62. Alternatively, outer spacers 64 can be omitted and all perforated plates 62 can ride directly upon each other eliminating the air gap. In the present embodiment, perforated plate 62 is confined in outlet 60 and positioned across fluid flow path 59 while being supported by lower portion 53 of housing 52. These perforated plates 62 are captured between the radially inwardly extending lip 76 on the end of lower portion 53 and are maintained in position by displacer 74. Each perforated plate 62 has a plurality of apertures 65 that extend through perforated plate 62. Apertures 65 extend from topside 66 of perforated plate 62 through to bottom side 68. Perforated plate 62 is comprised of filter material 82. As used herein, filter material 82 can be any plate, mesh, screen, sheet, panel, flap, partition, shield, plug, substrate, or the like whether impermeable or permeable being made of metal, plastic, glass, cloth, paper, and the like whether woven, non-woven, or otherwise, and whether porous or not. Perforated plate 62 includes plurality of apertures 65 formed in filter material 82 such that the liquid passing through perforated plate 62 primarily passes through apertures 65.

An alternative embodiment of outlet 60 is shown in FIG. 3b. This embodiment includes two perforated plates 62 extending across fluid flow path 59. Perforated plates 62 are supported by being confined between radially inwardly extending lip 76 and displacer 74 within lower portion 53 of housing 52. Outer spacers 64 are placed between first and second perforated plates 62 as well as between second perforated plate 62 and displacer 74. Outer spacer 64 creates an air gap between the two perforated plates 62. Topside 66 of lower perforated plate 62 is adjacent bottom side 68 of upper perforated plate 62. A plurality of apertures 65 extend through from topside 66 to bottom side 68 of both perforated plates 62. The plurality of apertures 65 in perforated plate 62 can be aligned with each other as illustrated in FIG. 3b or alternatively apertures 65 in each overlying perforated plate 62 can be misaligned as illustrated in FIG. 3a. The air gap between adjacent perforated plates 62 can be changed by increasing or decreasing height "T" of outer spacer 64.

In another embodiment of outlet 60, a single perforated plate 62 can be utilized as shown in FIG. 3c. Perforated plate 62 is captured between lip 76 and displacer 74 at lower portion 53 of housing 52. Perforated plate 62 is positioned such that it extends across fluid flow path 59 in order for the liquid to pass through the plurality of apertures 65 in perforated plate 62. As illustrated, outer spacer 64 confines perforated plate 62 against lip 76 of lower portion 53. It should be understood that outer spacer 64 could be positioned such that perforated plate 62 directly contacts displacer 74 and outer spacer 64 is placed such that it directly contacts lip 76 thereby positioning perforated plate 62 to form a recessed outlet 60 within lower portion 53. In this manner, bottom side 68 of perforated plate 62 would be spaced away from lip 76 and topside 66 would be in contact with displacer 74.

Figure 4:
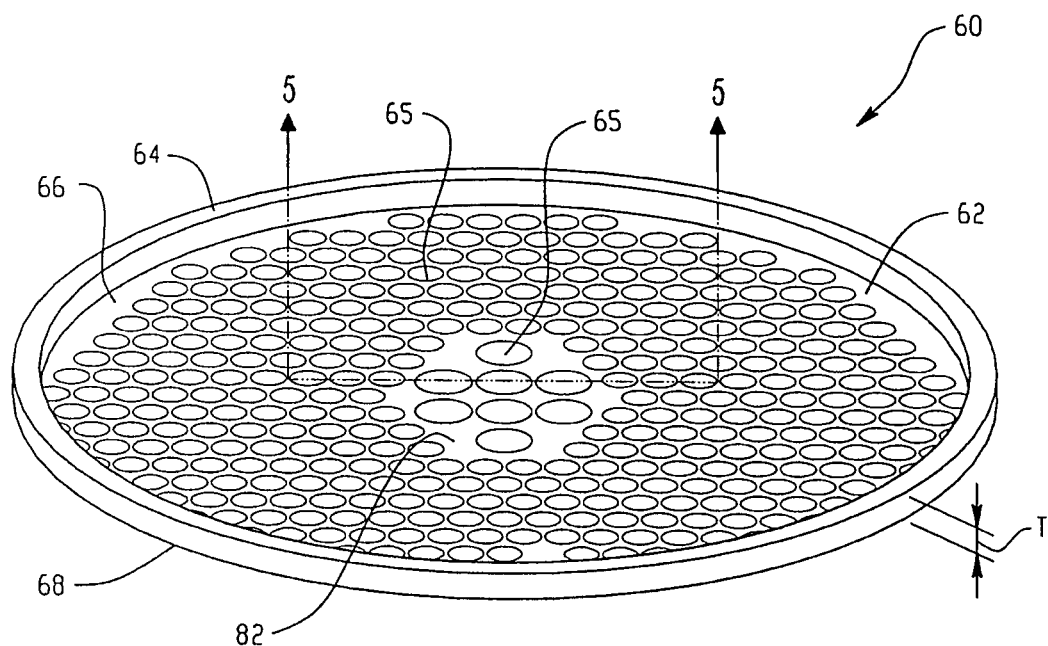
FIG. 4 is a perspective view of a perforated plate of the present invention.

Referring now to FIG. 4 wherein a perspective view of outlet 60 formed by a single perforated plate 62 having an outer spacer 64 around the periphery of perforated plate 62 is illustrated. In this view, top side 66 of filter material 82 forming perforated plate 62 is visible whereas bottom side 68 cannot be seen. Outer spacer 64 is shown having a height or thickness T. A plurality of apertures 65 are shown. Apertures 65 located in the center portion or centrally located within perforated plate 62 are larger than apertures 65 that are located radially outward from the center of perforated plate 62.

Figure 5:
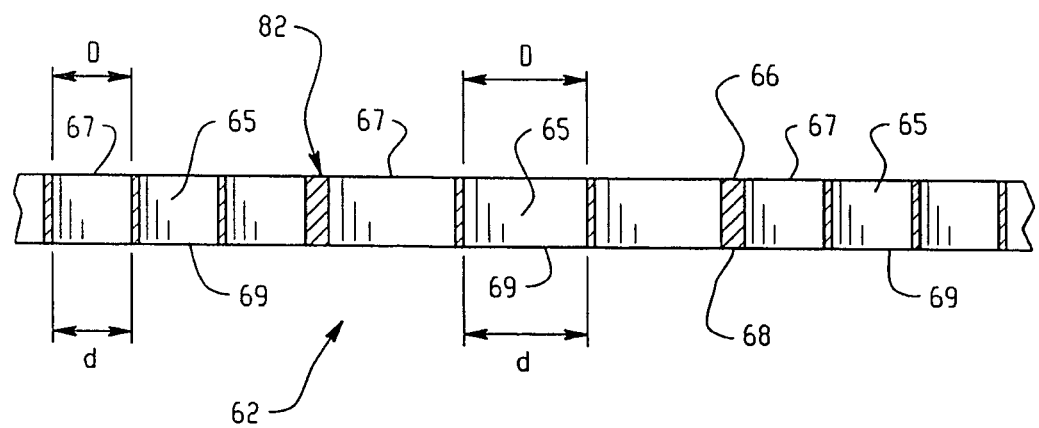
FIG. 5 is a partial cross-sectional view of the perforated plate of FIG. 4.

A partial cross-sectional view of filter material 82 having a plurality of apertures 65 across the center portion of perforated plate 62 is shown in FIG. 5, which is a sectional view taken at section line 5-5 of FIG. 4. In this illustration, topside 66 of perforated plate 62 and bottom side 68 along with the plurality of apertures 65 are shown. Each aperture 65 passes through filter material 82 of perforated plate 62. At topside 66 each aperture 65 has an entrance 67 and correspondingly at bottom side 68 each aperture 65 has an exit 69. In one embodiment of aperture 65, entrance 67 and exit 69 are circular and aperture 65 can form a right cylinder. In such an embodiment, smaller aperture 65 has an exit 69 of diameter d and an entrance 67 of diameter D, wherein larger aperture 65 has a corresponding diameter D at entrance 67 and diameter d at exit 69. It is understood in this illustration that the entrance 67 and exit 69 area associated with larger apertures 65 is greater than the entrance 67 and exit 69 area associated with smaller apertures 65. In an alternative embodiment entrance 67 diameter D need not be the same size as exit 69 diameter d, and there could also be an intermediate diameter spaced between diameter D and diameter d which can be the same or a different size. Such an alternative embodiment can be utilized to increase the surface tension in order to help prevent unintended dripping of liquid by increasing the fluid resistance through apertures 65 as is disclosed in European Patent Application EP0 784010 B1 entitled "Liquid Charging Nozzle Plate."

Figure 6:
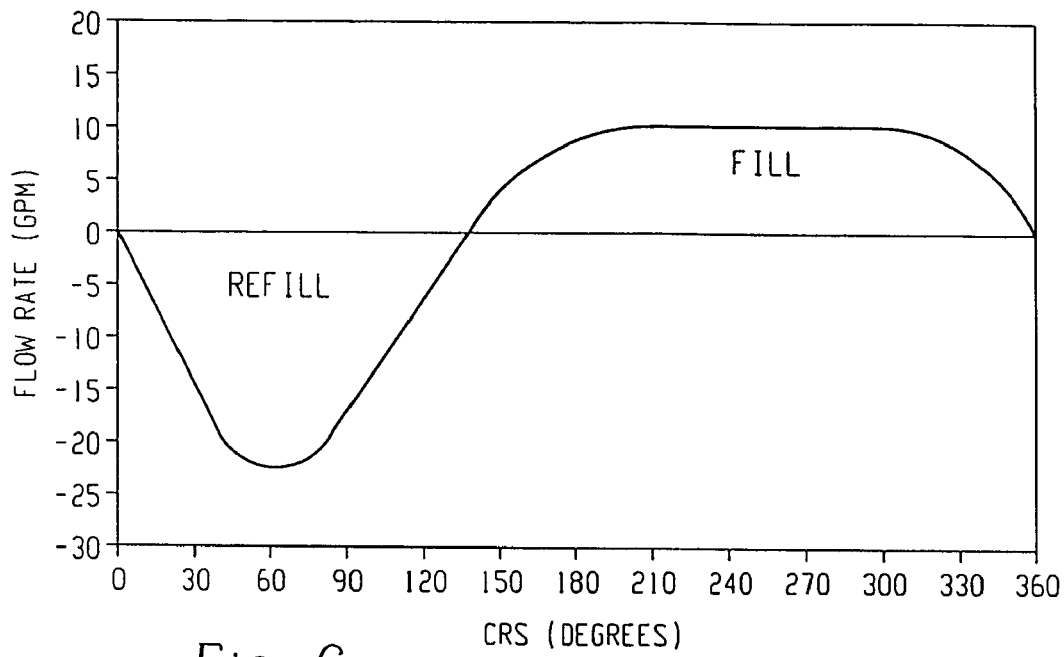
FIG. 6 is a graphical illustration of the fluid pressure during the fill and refill cycle of the present invention.

Turning now to FIG. 6, which is a theoretical graphical illustration of the pressure of the fluid while flowing through the present invention. During the fill cycle, which is when piston 30 moves toward inlet check valve 25 within cylinder 33, piston 30 causes any liquid contained within cylinder 33 to be pushed out of cylinder 33. As fluid is pushed out of cylinder 33 it enters connector tube 37 and is blocked from back flowing through inlet tube 20 by inlet check valve 25 so that the liquid is pressurized and forced through discharge tube 40 toward discharge check valve 54 within dispensing nozzle 50. This fluid flow path 59 guides the liquid toward flow control device 58 and discharge check valve 54 is opened allowing liquid to flow though outlet 60 passing through perforated plate 62 and out through apertures 65.

During the fill cycle of a typical liquid dispensing apparatus 10, there may be three distinct stages. First is the acceleration stage during which the liquid is pushed by piston 30 out of cylinder 33, through discharge tube 40 into dispensing nozzle 50. The slope of the curve exhibited in the graph of FIG. 6 represents an increase in pressure as the liquid is started in motion. Next, optionally, is a constant velocity stage during which the liquid is being pushed out dispensing nozzle 50 through apertures 65 in perforated plate 62 by piston 30. Finally there is a deceleration stage when piston 30 has stopped pushing the liquid and the liquid pressure is decaying.

After this fill cycle is completed, the refill cycle begins as piston 30 reverses direction and moves away from inlet check valve 25 within cylinder 33. This movement of piston 30 generates a vacuum pressure or suction reflected in FIG. 6 as a negative flow rate in gallons per minute. As the vacuum pressure is generated, discharge check valve 54 moves from an open position toward a closed position as illustrated in FIG. 2b.

Figure 7:
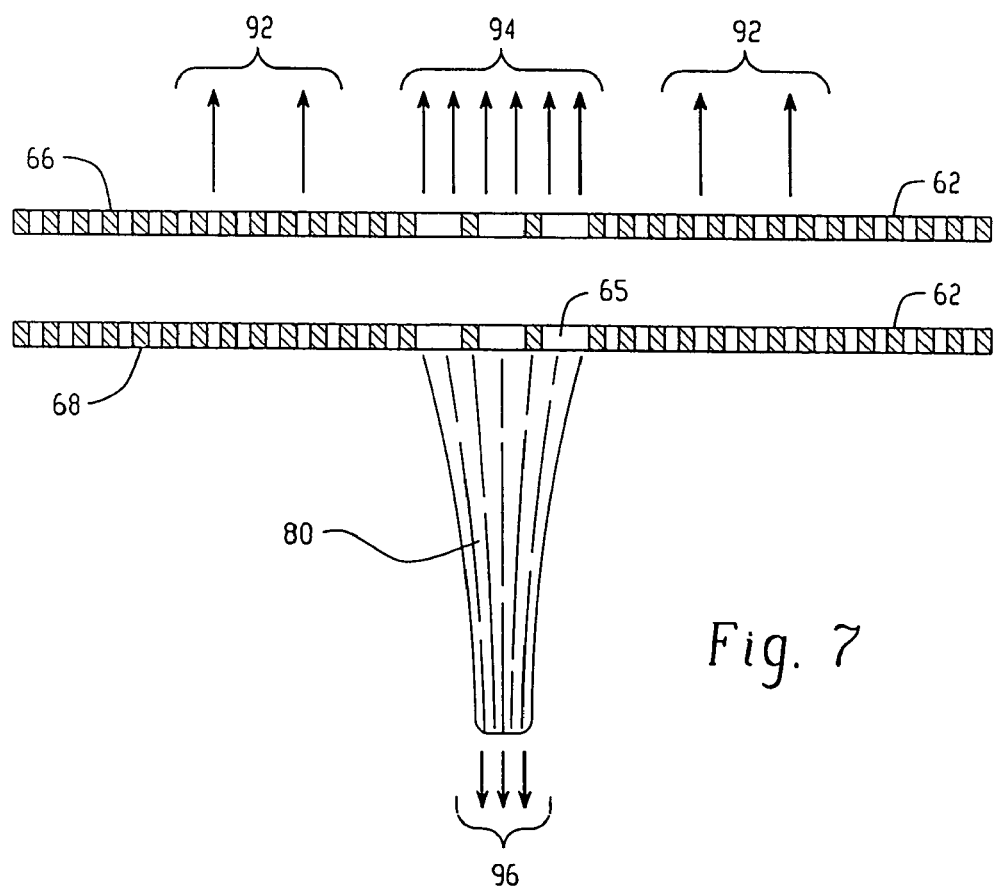
FIG. 7 is an illustration of the decay in fluid flow as the liquid exists the fluid discharge nozzle when the discharge check valve moves toward the closed position as illustrated in FIG. 2b.

This refill cycle can also be referred to as a vacuum pressure cycle or "suck-back" cycle which is further illustrated in FIG. 7 wherein arrows 92 and 94 illustrate the vacuum pressure or suction. Arrow 94 illustrate the vacuum pressure effect at the central portion of perforated plate 62. The centrally positioned vacuum pressure arrows 94 are concentrated and are a result of larger sized apertures 65 being centrally positioned in perforated plate 62. This vacuum pressure 92, 94 applies a suction force to stream of liquid 80, which is passing through perforated plate 62, in a direction opposed to the gravitational force illustrated by arrows 96.

Ordinarily the stream of liquid 80 coming out of outlet 60 through perforated plate 62 is shaped as an inverted cone being larger on bottom side 68 of perforated plate 62 and growing smaller as gravity 96 accelerates the liquid away from perforated plate 62. As the fill cycle ends the inverted cone shape stream of liquid 80 grows smaller and thinner until finally all flow is cut off.

Since the intentional liquid flow is cut off when discharge check valve 54 moves into its intermediate position toward closing (as illustrated in FIG. 2b), there is no additional liquid added to stream of liquid 80. Vacuum pressure 92, 94 is counteracting the force of gravity 96 upon stream of liquid 80. Therein, stream of liquid 80 is a decaying flow and this stream of liquid 80 diminishes while it is still in contact with bottom side 68 of perforated plate 62. The vacuum suction applied to topside 66 of perforated plate 62 and especially at larger apertures 65 that are centrally located in perforated plate 62 enables the greatest amount of vacuum pressure 94 to be applied to the center portion of stream of liquid 80. When this suction is initiated by piston 30 reversing direction within cylinder 33, this vacuum pressure 94 increases the rate at which stream of liquid 80 decays causing stream of liquid 80 to disconnect faster from bottom side 68 of perforated plate 62 in the form of a droplet of liquid. The shorter the decay time, the faster a filled container can be moved from beneath dispensing nozzle 50 and the quicker an empty container can be moved into position for filling by liquid dispensing apparatus 10. This vacuum pressure cycle along with large apertures 65 located in the center of perforated plate 62 enables significantly increased rates of speed at which containers can be changed or moved during the filling operation without inadvertently spilling any of the liquid outside of the container. Capillary action in apertures 65 of perforated plate 62 allows outlet 60 of dispensing nozzle 50 to hold the liquid without any flow or drips occurring after the fluid flow has been shut off.

The present invention helps to concentrate the greatest vacuum force on the decaying portion of stream of liquid 80 right in the center of perforated plate 62. By adding larger apertures 65 or a coarser mesh section in the center of perforated plate 62 where stream of liquid 80 below dispensing nozzle 50 is decaying, the vacuum pressure 94 will have greatest effect. When the liquid is no longer being pushed out discharge check valve 54 and discharge check valve 54 begins to close is when the vacuum pressure cycle begins. During this vacuum pressure cycle, liquid can also be sucked, by the vacuum pressure 94, from between perforated plates 62 when there are multiple perforated plates 62 utilized at outlet 60 and from below the discharge check valve 54 since a backflow is caused by the vacuum pressure 94 through perforated plates 62. There may still be an inverted cone of stream of liquid 80 hanging below perforated plate 62 but this vacuum pressure 94 helps to draw some of this liquid back up into dispensing nozzle 50 speeding the decay of stream of liquid 80.

Figure 8:
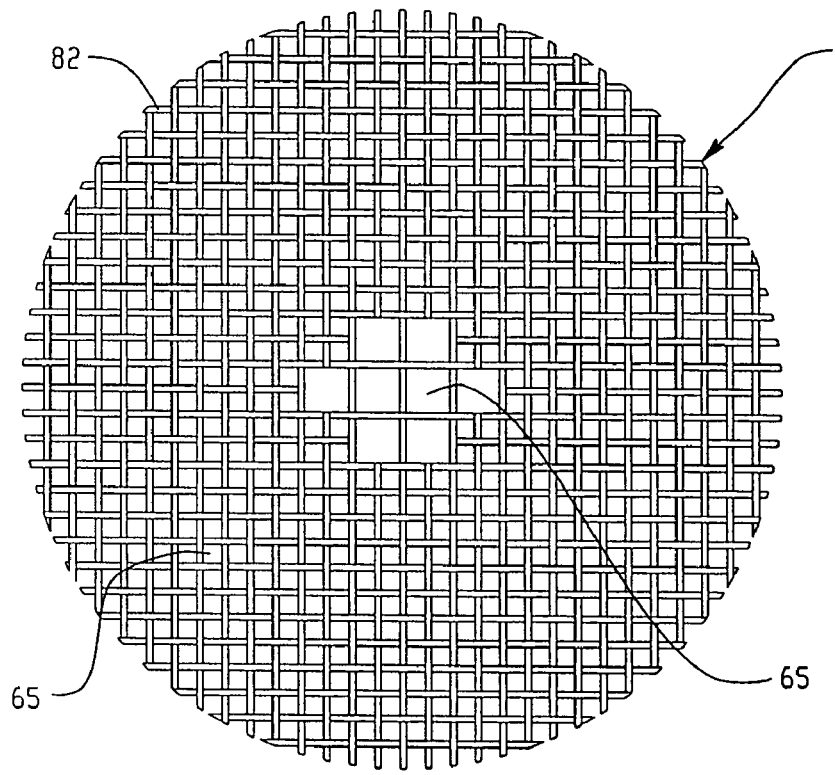
FIG. 8 is a top plan view of a perforated plate according to the present invention.

Various perforated plates 62 can be utilized in the present invention having a plurality of apertures 65 extending there through including the embodiment of a perforated plate 62 as shown in FIG. 8. This top plan view of perforated plate 62 has a periphery that is circular wherein apertures 65 extend through filter material 82 and apertures 65 are somewhat rectangular in shape. In a central portion of perforated plate 62 are located larger apertures 65 surrounded by a plurality of smaller apertures 65. A representative perforated plate 62 of this nature could be constructed from filter material 82 in the form of a wire mesh.

Figure 9:
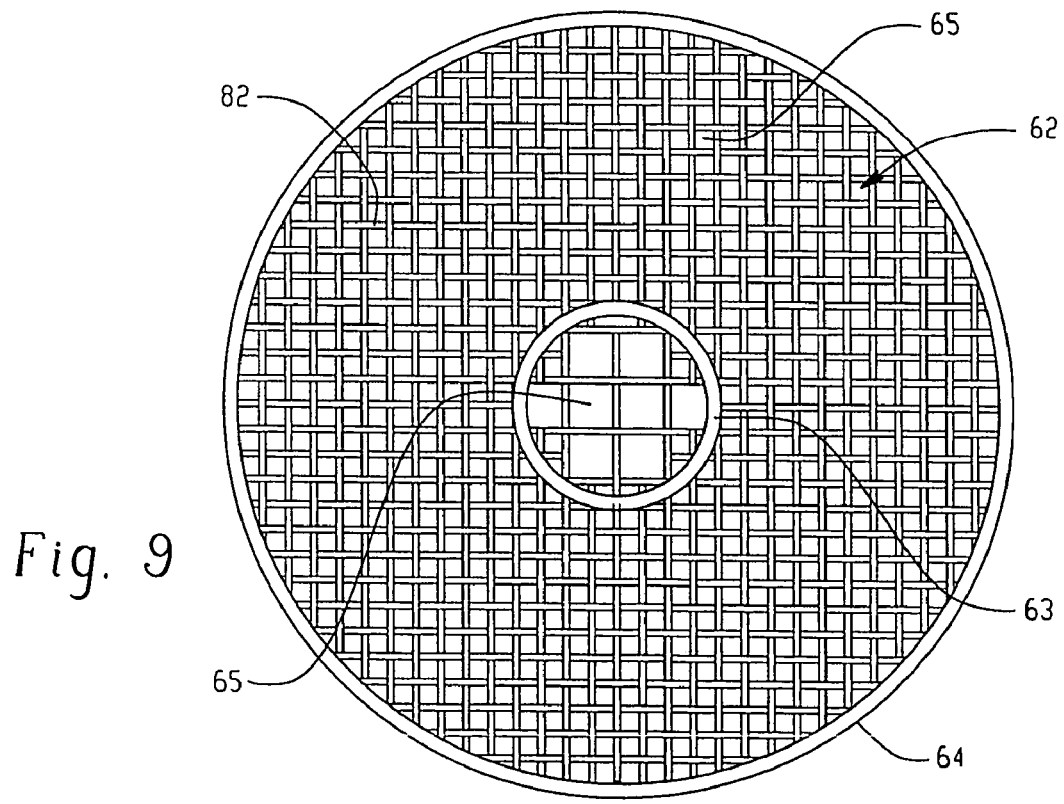
FIG. 9 is a top plan view of an alternative embodiment of a perforated plate according to the present invention.

An alternative embodiment of a perforated plate 62 is shown in FIG. 9. Perforated plate 62 having larger apertures 65 located in the central portion with smaller apertures 65 surrounding that central portion and extending through filter material 82 is illustrated having an outer spacer 64 at the perimeter of perforated plate 62 and inner spacer 63 is located at the perimeter of larger apertures 65 located in the center of perforated plate 62. In this embodiment the thickness or height of outer spacer 64 may be the same as inner spacer 63 to provide a central supporting structure when perforated plates 62 are stacked together in a multiple perforated plate 62 configuration at outlet 60. An air gap formed between the multiple perforated plates 62 is maintained by outer spacer 64 and inner spacer 63. Such a configuration is helpful when there are thick or high viscosity liquids being dispensed through dispensing nozzle 50 and passing through outlet 60 through plurality of apertures 65 in perforated plate 62.

Figure 10:
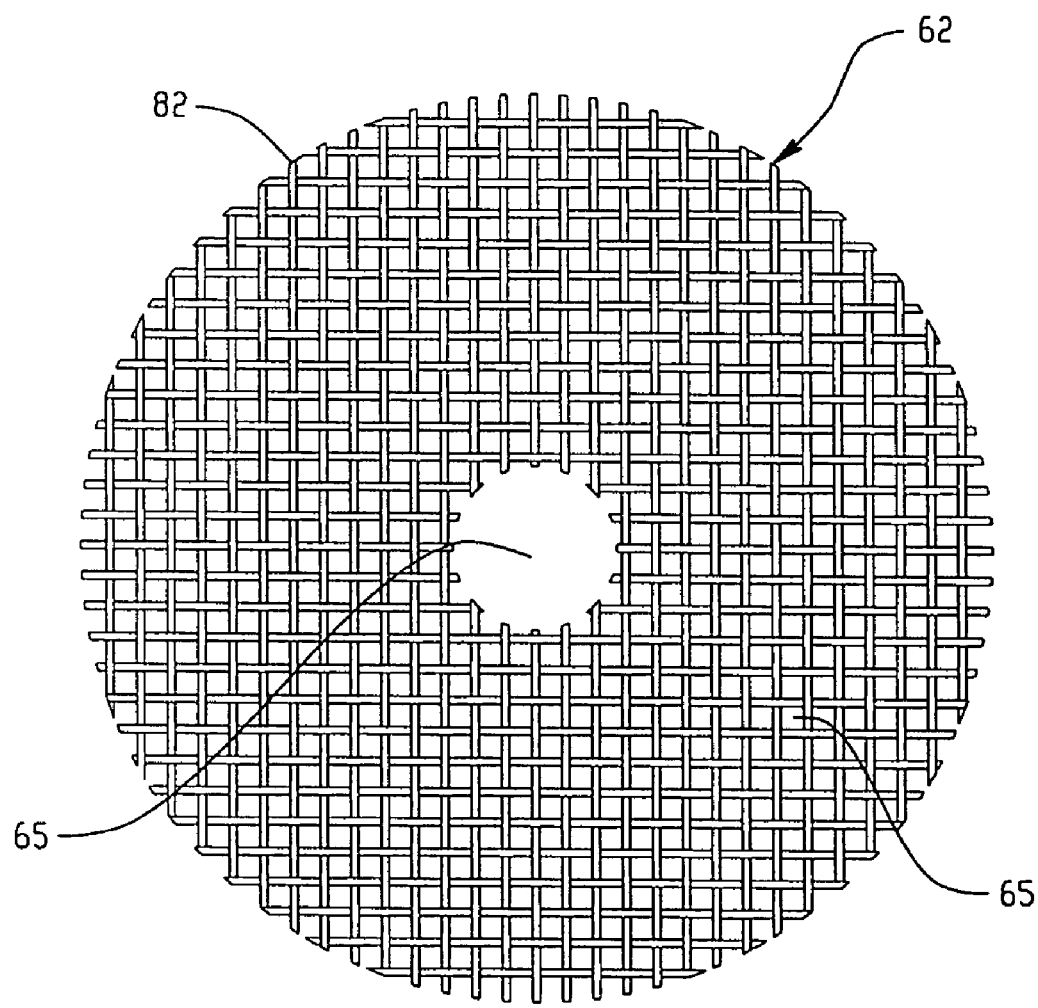
FIG. 10 is a top plan view of another alternative embodiment of a perforated plate according to the present invention.

Another embodiment of perforated plate 62 is shown in FIG. 10. In this embodiment, perforated plate 62 has a single large aperture 65 in the center of perforated plate 62. This large aperture 65 extends through filter material 82 and is surrounded by a plurality of smaller apertures 65 in perforated plate 62.

Figure 11:
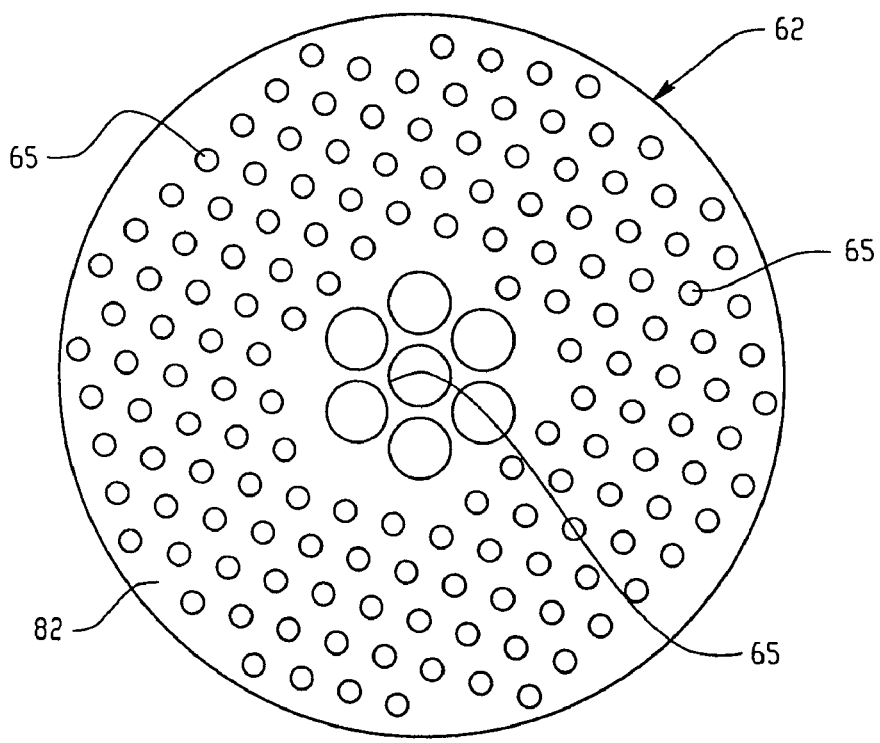
FIG. 11 is a top plan view of yet another alternative embodiment of a perforated plate according to the present invention.

Referring now to FIG. 11, yet another embodiment of perforated plate 62 is illustrated. Perforated plate 62 is shown as being constructed from filter material 82 in the form of a generally circular plate with apertures 65 extending through filter material 82. Apertures 65 are generally circular in shape and there are larger apertures 65 in the center of perforated plate 62 surrounding by a plurality of smaller circular apertures 65. While perforated plate 62 is shown being substantially circular, a variety of other shapes whether regular or irregular can be utilized in the construction and arrangement of fluid flow path 59 and outlet 60.

Figure 12:
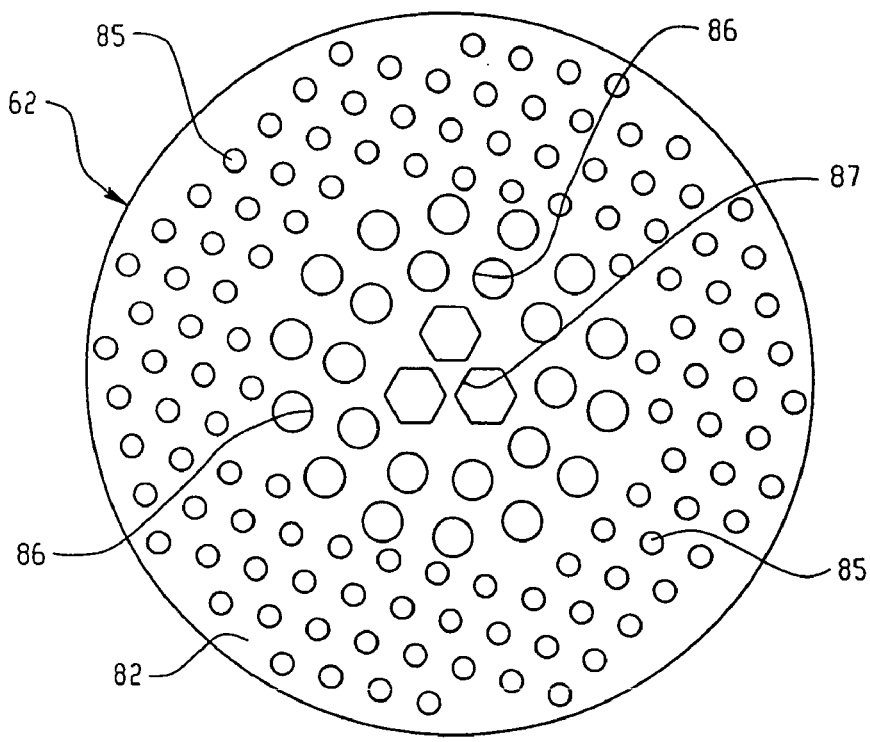
FIG. 12 is a top plan view of further still another alternative embodiment of a perforated plate according to the present invention.

The embodiment illustrated in FIG. 12 has three different sizes of apertures 65 in three different regions of filter material 82 in perforated plate 62. In particular, this embodiment of perforated plate 62 has large hexagonal apertures 87 located in the center region of perforated plate 62 with a plurality of medium sized circular apertures 86 surrounding the large hexagonal apertures 87. Surrounding medium size aperture 86 there is a plurality of smaller apertures 85 that extend through perforated plate 62. Moreover, such apertures 65 could also be rectangular, triangular, octagonal, or any other desirable shape. The shape of apertures 65 may be selected for desirable fluid flow characteristics for the particular dispensing nozzle 50 as the liquid passes through perforated plate 62. All of these and more alternative configurations of perforated plate 62 can be utilized as a portion of flow control device 58 to modify flow control device 58 at outlet 60.

Many other alternative embodiments and configurations may be apparent to those of ordinary skill in the art. For example, dispensing nozzle 50 could be constructed with a flapper-type discharge check valve 54. In addition to beverages and other flowable food substances, liquid dispensing apparatus 10 of the present invention can be used for non-food grade flowable substances and liquids such as beauty care products, healthcare products, pharmaceuticals, lubricants, fuels, additives, solvents, pesticides, herbicides and any other liquid or fluid substances. Additionally, various sizes and shapes of apertures can be utilized to obtain an appropriate vacuum pressure cycle to counteract the force of gravity on stream of liquid 80 in order to modify the intended flow of liquid or to shut off the unintended flow of liquid and avoid spillage as filled containers are moved away from outlet 60 of dispensing nozzle 50 in order for liquid dispensing apparatus 10 to charge or fill other containers. The various aperture 65 shapes can be formed using commonly known methods and processes such as through the use of laser, water jet, and conventional drilling or through the use of punch press, weaving, or other processes.

Whether there are multiple perforated plates 62 with various sized apertures 65, or multiple perforated plates 62 with variations in mesh sizing in certain areas, or a combination of both. Perforated plates 62 with a plurality of apertures 65 having larger apertures 65 in the center portion can be intermixed with mesh screens and perforate plates having uniform aperture 65 sizes therein. The size and shape of apertures 65 can be varied as a function of the liquid viscosity, fluid surface tension, flow speed of the liquid being discharged, the capillary action of perforated plates 62, and the ability of the liquid to resist air being drawn back up into outlet 60.

While a number of particular embodiments of the present invention have been described and illustrated, it will be understood to those skilled in the art that various additional changes and modifications can be made without departing from the spirit and scope of the present invention. Accordingly, it is intended to cover, in the appended claims all such changes and modifications that are within the scope of this invention.

What is claimed is:

1. A fluid dispensing nozzle for dispensing and cutting off a stream of liquid into a container, the fluid dispensing nozzle comprising:
   a housing having a fluid flow path therethrough, the housing having an upper portion defining an inlet and a lower portion defining an outlet;
   a discharge check valve disposed within the housing, between the inlet and the outlet, the discharge check valve having an open position allowing a stream of liquid flow from the inlet to the outlet, an intermediate position that stops the liquid flow through the discharge check valve, and a closed position, wherein the discharge check valve is capable of creating a vacuum pressure at the outlet end during closing between the intermediate position and the closed position; and
   at least one perforated plate being supported by the housing and being positionable and confinable within the fluid flow path at the outlet, the at least one perforated plate having a plurality of apertures therethrough wherein there are at least two differently sized apertures including at least one larger size aperture and at least one smaller size aperture, wherein the at least one larger size aperture is positioned radially inboard of the at least one smaller size aperture, wherein the created vacuum pressure applied at the at least one larger size aperture increases the rate of decay of the liquid stream for dispensing into the container.

2. The fluid dispensing nozzle according to claim 1, wherein the at least one larger size aperture is centrally located within the at least one perforated plate.

3. The fluid dispensing nozzle according to claim 1, comprising a plurality of perforated plates within the fluid flow path.

4. The fluid dispensing nozzle according to claim 1, wherein the discharge check valve is capable of creating a vacuum pressure during closing.

5. The fluid dispensing nozzle according to claim 1 wherein the at least one smaller size aperture includes a plurality of smaller size apertures.

6. The fluid dispensing nozzle according to claim 5 wherein the at least one larger size aperture includes a plurality of larger size apertures.

7. The fluid dispensing nozzle according to claim 6 comprising a plurality of perforated plates within the fluid flow path.

8. The fluid dispensing nozzle according to claim 7, further comprising a spacer at the outlet and wherein the spacer maintains separation between the at least one perforated plate and another of the plurality of perforated plates.

9. A fluid dispensing nozzle for dispensing and cutting off a stream of liquid into a container, the fluid dispensing nozzle comprising:
   a housing having a fluid flow path therethrough and an outlet;
   a discharge check valve within the housing, the discharge check valve having an open position allowing a stream of liquid to the outlet, an intermediate position that stops the liquid flow through the discharge check valve, and a closed position, wherein the discharge check valve is capable of creating a vacuum pressure at the outlet end during closing between the intermediate position and the closed position; and
   at least one perforated plate being supported by the housing and being positionable and confinable within the fluid flow path at the outlet, the at least one perforated plate having a plurality of apertures therethrough wherein the plurality of apertures include at least two differently sized sets of apertures including a set of larger size apertures and a set of smaller size apertures, wherein the set of larger size apertures is positioned radially inboard of the set of smaller size apertures, wherein the created vacuum pressure applied at the set of larger size apertures increases the rate of decay of the liquid stream for dispensing into the container.

10. The fluid dispensing nozzle according to claim 9, wherein the set of larger size apertures are centrally located within the perforated plate.

11. The fluid dispensing nozzle according to claim 9, comprising a plurality of perforated plates.

12. The fluid dispensing nozzle according to claim 11, wherein at least one of the plurality of perforated plates is formed of a wire mesh.

13. The fluid dispensing nozzle according to claim 12, wherein there is at least one aperture of the set of larger size apertures having a shape that is different from another aperture.

14. The fluid dispensing nozzle according to claim 13, wherein the at least one aperture of the set of larger size apertures is substantially rectangular.

15. The fluid dispensing nozzle according to claim 14, further comprising a spacer and wherein the spacer is positioned to maintain separation between the at least one perforated plate and another perforated plate.

16. A fluid discharge nozzle for dispensing and cutting off a stream of liquid into a container, the fluid dispensing nozzle comprising:
   a nozzle body containing a flow control device within the nozzle body,
   the flow control device includes a discharge check valve and an outlet, the discharge check valve having an open position allowing liquid flow to the outlet, an intermediate position that stops the liquid flow though the discharge check valve and a closed position wherein the discharge check valve is capable of creating a vacuum pressure cycle at the outlet end during closing between the intermediate position and the closed position, and the outlet being formed from at least one perforated plate wherein the at least one perforated plate includes a plurality of apertures, wherein at least one aperture is larger than a size of at least one other aperture, wherein the at least one larger size aperture is positioned radially inboard of the at least one other aperture, and wherein the created vacuum pressure applied at the at least one larger size aperture increases the rate of decay of the liquid stream for dispensing into the container.

17. The fluid discharge nozzle according to claim 16, wherein the at least one larger size aperture is centrally located within the at least one perforated plate.

18. The fluid discharge nozzle according to claim 17, comprising a plurality of perforated plates within the fluid flow path.

19. The fluid discharge nozzle according to claim 18, further comprising a spacer at the outlet and wherein the spacer maintains separation between the at least one perforated plate and another of the plurality of perforated plates.

* * * * *

UNITED STATES PATENT AND TRADEMARK OFFICE
CERTIFICATE OF CORRECTION

PATENT NO. : 7,594,616 B2
APPLICATION NO. : 11/109520
DATED : September 29, 2009
INVENTOR(S) : Hupp Page 1 of 1

It is certified that error appears in the above-identified patent and that said Letters Patent is hereby corrected as shown below:

Column 4, line 13, delete "0-ring" and insert --O-ring--.

Column 6, line 11, delete "EP0" and insert --EPO--.

Column 6, line 50, delete "Arrow" and insert --Arrows--.

Claim 16, line 41, delete "though" and insert --through--.

Signed and Sealed this

Seventeenth Day of November, 2009

David J. Kappos
*Director of the United States Patent and Trademark Office*